(12) United States Patent
Smith

(10) Patent No.: US 12,053,081 B2
(45) Date of Patent: Aug. 6, 2024

(54) SYSTEM AND METHOD FOR AN ADJUSTABLE SUPPORT STAKE FOR SECURING AND SUPPORTING ITEMS ABOVE THE GROUND

(71) Applicant: Clay Smith, Dallas, GA (US)

(72) Inventor: Clay Smith, Dallas, GA (US)

(*) Notice: Subject to any disclaimer, the term of this patent is extended or adjusted under 35 U.S.C. 154(b) by 0 days.

(21) Appl. No.: 18/072,594

(22) Filed: Nov. 30, 2022

(65) Prior Publication Data

US 2024/0172862 A1    May 30, 2024

(51) Int. Cl.
*A45F 3/44* (2006.01)
*A01K 1/04* (2006.01)

(52) U.S. Cl.
CPC . *A45F 3/44* (2013.01); *A01K 1/04* (2013.01)

(58) Field of Classification Search
CPC .......... A45F 3/44; A01K 1/04; A01K 27/004; B65H 75/4471; B65H 75/4431; A45B 25/22; A63B 2071/024; E04H 12/2223; A01G 17/12; A01G 9/122; A01G 9/124; A01G 9/126; B60P 7/0846; B60P 7/0823
USPC ........................................................ 248/156
See application file for complete search history.

(56) References Cited

U.S. PATENT DOCUMENTS

| | | | | | |
|---|---|---|---|---|---|
| 2,217,323 A | * | 10/1940 | Sackett | .............. | B65H 75/4444 242/379.2 |
| 2,349,110 A | * | 5/1944 | Potstada | ................ | A01G 9/124 52/165 |
| 3,021,091 A | * | 2/1962 | Swanson | ............... | D06F 53/045 242/384.7 |
| 3,123,052 A | * | 3/1964 | Marshall | .............. | A01K 27/004 242/406 |
| 3,806,992 A | * | 4/1974 | Reimer | ................... | F16G 11/12 242/388.3 |
| 3,856,265 A | * | 12/1974 | Foster | ..................... | F16G 11/12 52/157 |
| 3,937,418 A | * | 2/1976 | Critelli | ................. | A01K 27/004 119/796 |
| 4,138,806 A | * | 2/1979 | Miller | ................ | E04B 1/34347 52/157 |

(Continued)

FOREIGN PATENT DOCUMENTS

| | | | | | |
|---|---|---|---|---|---|
| KR | 101107732 B1 | * | 1/2012 | ............. | A01G 9/126 |
| KR | 20160038368 A | * | 4/2016 | ............. | B65H 75/18 |
| KR | 20190040532 A | * | 4/2019 | ............. | A01G 17/12 |

*Primary Examiner* — Taylor Morris
(74) *Attorney, Agent, or Firm* — Lisa Foundation Patent Law Clinic; Qiguang Pan

(57) ABSTRACT

An adjustable support stake for securing and supporting items above the ground including a substantially tapered stake at a first end and a housing formed around a rotatable member that can be rotated about a longitudinal axis from an access point on the housing at a second end. The rotatable member being capable of attaching to a cable that is also attached to the item to be secured or supported so that when the rotatable member is rotated the tension in the cable is increased. A tension release member further allows for adjustability by reducing cable tension when decoupled from the rotational member. The adjustable support stake can be used by inserting the stake into the ground, attaching a cable to both the rotatable member and the item to be supported, and rotating the rotatable member to create tension in the cable.

20 Claims, 3 Drawing Sheets

(56) References Cited

U.S. PATENT DOCUMENTS

| | | | | |
|---|---|---|---|---|
| 4,141,146 A * | 2/1979 | Broom | | G01B 3/11 |
| | | | | 33/413 |
| 4,187,996 A * | 2/1980 | Ehrlich | | A01G 9/126 |
| | | | | 248/330.1 |
| 4,296,568 A * | 10/1981 | Dukes | | A01G 13/0206 |
| | | | | 47/17 |
| 4,416,429 A * | 11/1983 | Jessamine | | B63B 34/67 |
| | | | | 242/395 |
| 4,830,382 A | 5/1989 | Wheeler | | |
| 4,993,719 A * | 2/1991 | Hernandez | | A63B 69/0095 |
| | | | | 473/492 |
| 5,649,674 A * | 7/1997 | Cielker | | B65H 75/364 |
| | | | | 242/406 |
| 5,881,495 A * | 3/1999 | Clark | | A01G 9/12 |
| | | | | 52/165 |
| 5,901,526 A * | 5/1999 | Vidmar | | E04H 12/2215 |
| | | | | 47/33 |
| 6,202,367 B1 * | 3/2001 | Marino | | A01G 9/28 |
| | | | | 47/33 |
| 6,234,444 B1 * | 5/2001 | Haddad | | A01G 9/122 |
| | | | | 248/533 |
| 6,363,655 B1 * | 4/2002 | Napolitano | | A01G 9/12 |
| | | | | 47/42 |
| 6,419,175 B1 * | 7/2002 | Rankin, VI | | A45F 5/004 |
| | | | | 242/379.2 |
| 6,595,496 B1 * | 7/2003 | Langlie | | A01K 3/005 |
| | | | | 256/10 |
| 6,938,370 B2 | 9/2005 | Johns | | |
| 7,234,417 B2 * | 6/2007 | Laird | | A01K 1/04 |
| | | | | 119/791 |
| 7,493,873 B2 * | 2/2009 | Petersen | | A01K 27/004 |
| | | | | 119/789 |
| 7,909,310 B2 * | 3/2011 | Weiner | | E01F 9/685 |
| | | | | 256/45 |
| 8,402,925 B2 * | 3/2013 | Le Croix | | B65H 75/4431 |
| | | | | 119/796 |
| 8,528,275 B2 * | 9/2013 | Paananen | | E04H 12/2215 |
| | | | | 52/155 |
| 8,919,041 B2 * | 12/2014 | Topping | | A01G 9/28 |
| | | | | 47/58.1 LS |
| 9,038,308 B2 * | 5/2015 | Smith | | A01M 31/06 |
| | | | | 43/2 |
| 9,899,823 B1 * | 2/2018 | Catinis | | F16L 3/06 |
| 10,440,901 B2 * | 10/2019 | Eaton | | A01G 9/122 |
| 10,477,930 B2 * | 11/2019 | Kuypers | | A45B 23/00 |
| 10,485,222 B2 * | 11/2019 | Skinner | | A01K 27/004 |
| 10,723,255 B2 * | 7/2020 | Plahuta | | B60P 7/0846 |
| 10,729,226 B1 | 8/2020 | Zamora | | |
| 11,178,959 B1 | 11/2021 | Stockton et al. | | |
| 11,511,963 B2 * | 11/2022 | Miller | | H02G 1/085 |
| 2006/0060749 A1 * | 3/2006 | Dahlstrom | | A45F 3/44 |
| | | | | 248/156 |
| 2007/0176158 A1 * | 8/2007 | Robinson | | E01F 13/028 |
| | | | | 256/12.5 |
| 2007/0215064 A1 * | 9/2007 | Petersen | | A01K 1/04 |
| | | | | 119/786 |
| 2008/0209802 A1 * | 9/2008 | Williams | | A01G 29/00 |
| | | | | 47/47 |
| 2011/0277382 A1 | 11/2011 | Davis | | |
| 2014/0209132 A1 * | 7/2014 | Landry | | A45B 25/22 |
| | | | | 24/129 R |
| 2017/0130480 A1 | 5/2017 | Perkins | | |
| 2018/0168259 A1 * | 6/2018 | Kim | | A43C 11/16 |
| 2019/0254254 A1 * | 8/2019 | Sharp | | A01K 1/04 |
| 2020/0369073 A1 * | 11/2020 | Cemke, Jr. | | B65H 75/4431 |
| 2021/0163255 A1 * | 6/2021 | Miller | | B65H 75/4486 |
| 2021/0176967 A1 * | 6/2021 | Colvin | | A01K 27/004 |

* cited by examiner

1

SYSTEM AND METHOD FOR AN ADJUSTABLE SUPPORT STAKE FOR SECURING AND SUPPORTING ITEMS ABOVE THE GROUND

BACKGROUND

1. Field of the Invention

The present invention relates generally to stakes for supporting plants or above ground objects in domestic and commercial situations.

2. Description of Related Art

Stakes are widely used as securing device with many different fields of application, gardening being one of the most prominent. Gardening under unpredictable weather conditions presents the need to provide support to a growing plant to maintain its health. Current methods of providing support to things like plants and tarps are generally limited to stationary stakes. Most stationary stakes need to be directly tied to the object to be supported or connected to the object by a distance of cable. As a plant grows vertically it frequently outgrows the stake it is tied to or the distance of cable it is attached by and can lead to harm to the plant or deformations in its growth. Accordingly, support stake systems that allow for adjusting the height of a stake or provide multiple fastening locations have been developed and widely used to alleviate this issue.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 11,178,959 discloses a support pole system for supporting articles above the ground that is formed from at least two elongated pole section that are moveably coupled together so that the pole sections can be moved telescopically to shorten or extend the support pole.

US Patent Publication 2011/0277382 A1 discloses an adjustable stake assembly comprising a stake coupled to a detachable body member, wherein the detachable body member comprises apertures along the body for affixing lattices, fences, plants or other structures.

U.S. Pat. No. 4,830,382 discloses a portable collapsible system for supporting a volleyball net at desired heights including a telescoping support assembles. The net support system comprises a support line that extends down the support assemblies and tension is created by engaging the support line in a cleat comprised of two jaw plates.

U.S. Pat. No. 10,729,226 discloses a support stand for hanging articles comprising a threaded portion for insertion into a sand environment, an elongated tube, and a set of post arms coupled to the elongated tube.

US Patent Publication 2017/0130480 discloses an adjustable stake comprising a lower pole including a hollow sleeve, an upper pole configured to insert into the hollow sleeve to allow it to freely rotate inside it. The lower pole further comprises a fixing unit coupled to the hollow sleeve and configured to hold the upper pole stationary with respect to the lower pole. This configuration allows for rotation of the upper pole as well as extending the length of the stake.

U.S. Pat. No. 6,938,370 discloses a tree support stake comprising a base with a plurality of tines extending horizontally from the base in multiple directions and also extend downwardly to secure the base and prevent rotation. The base is connected to the trunk, the trunk comprising a plurality of upward supports at various heights including a horizontal bar protruding at the top of each support.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present inventions provide among other things a system and method for supporting items above the ground by use of an adjustable support stake. The adjustable support stake system is configured to enable a user to support items above the ground by rotationally adjusting tension in an attached support cable without a need to detach the cable from the support stake itself or the object to be supported. The adjustable support stake comprises a substantially tapered stake at a first end for securing the system in the earth or ground and a rotatable member within a housing at the second end. The rotatable member is further configured to rotate around a longitudinal axis via an access point on the housing. A tension release member is coupled to the rotational member and positioned substantially perpendicular to it, allowing a user to control its rotation.

In one embodiment, a cable may be coupled to the rotational member within the housing and threaded through an aperture on the housing. By attaching a cable to the rotational member, a user may rotate the rotational member to create tension in the cable.

In one embodiment, the first end of the stake may be configured from two substantially planar members joined substantially perpendicular to each other along the longitudinal axis. This configuration of the first end allows for the first end to easily be inserted into the earth or ground while preventing the support stake from twisting in the ground.

In one embodiment, the tension release member may be configured so that it protrudes both inside and outside of the housing. The inner protrusion may further be configured to prevent the rotational member from rotating in one direction.

In one embodiment, the rotatable member may comprise a gear that is positioned substantially perpendicular to the rotatable member's vertical axis so that it aligns with the tension release member. This alignment allows the tension release member to couple to the teeth of the gear in order to prevent the rotational member from rotating in one direction.

In one embodiment, the tension release member may be configured to release the tension in the rotational member by decoupling it from the gear. The manner of decoupling may be the user's activation of the tension release member.

In one embodiment, the access point for the rotatable member may be a receiving end that allows a user to insert a tool into the access point. The user may then be able to apply torque to the tool in one direction to rotate the rotatable member and create tension.

In one embodiment, the access point for the rotatable member may be a rotatable cap on the housing that has a textured surface. The textured surface or notches allow for the user to have sufficient grip to rotate the rotatable member without use of a tool.

In one embodiment, an aperture may be included on the side of the housing to allow access to the rotational member within the housing. This allows a user to attach a cable or cord to the rotational member and connect the stake to the object that they wish to support.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The present inventions provide among other things a system and a method for adjustably supporting objects above the ground. Ordinarily, a support stake or system must be completely uncoupled from the object that it is supporting to allow a user to adjust the system and allow it to provide proper support to an object. The advantages of the disclosed inventions allow a user to adjust the support system without needing to uncouple the support system from the object that is being supported.

Figures 1, 2:
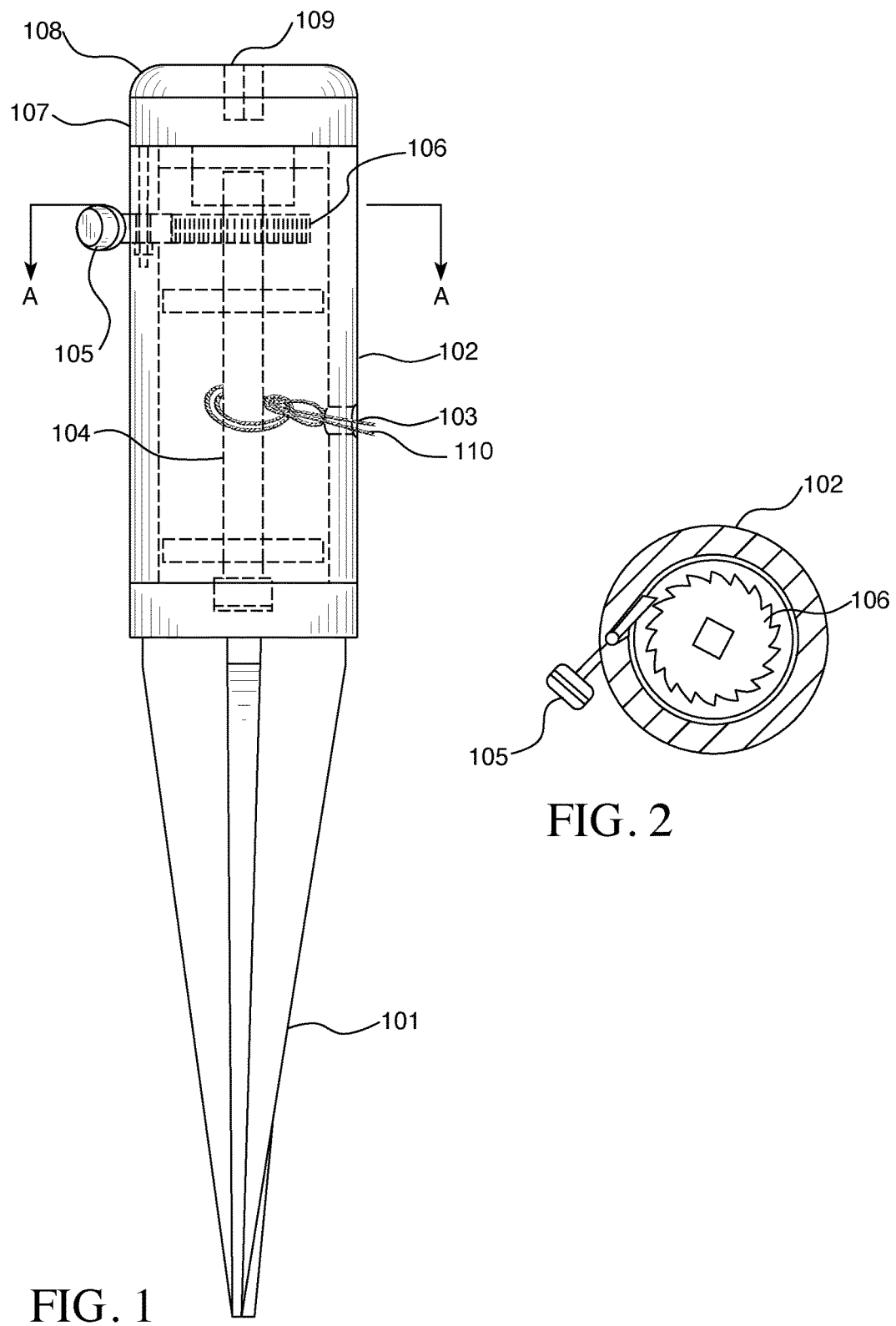
FIG. 1 depicts an embodiment of an adjustable support stake system in x-ray view from a side perspective.
FIG. 2 depicts a top-down cross-sectional view of an embodiment of the internal of the housing along the A-axis, showing how the tension release member is coupled to the rotatable member.

In one application, the system comprises a substantially tapered stake 101 and a housing 102, formed around a rotatable member 104. FIG. 1 shows the rotatable member 104 within the housing 102 and an aperture 103 on a first side of the housing 102 that allows access to the to the rotatable member. Though FIGS. 1-4 depict the housing 102 in a cylindrical shape, the housing may be formed from any shape such as by non-limiting example, rectangular prism, sphere, cubic, or trapezoidal prism. The rotatable member 104 within the housing is configured to rotate about the longitudinal axis 303 shown in FIG. 3, via use of an access point 107 on the housing 102. FIG. 2 depicts a cross section of FIG. 1 along the A axis and depicts a tension release member 105 coupled to the rotatable member 104 that allows for further adjustability to the support provided by the system. FIG. 1 also depicts how the tension release member 105 may be positioned substantially perpendicular to the rotatable member 104. A user may adjust the support stake by rotating the rotatable member 104 via the access point 107 on the housing 102 to create tension in the rotatable member.

In one application, the substantially tapered stake 101 may be configured from two substantially planar members 304, 305 that are joined substantially perpendicular to each other along the longitudinal axis 303. This configuration allows for the support stake to be easily inserted into the ground with the planar members 304, 305 providing resistance to movement of the substantially tapered stake 101.

Though FIGS. 1-4 present an embodiment with two planar members, any number of planar members may be used to comprise the substantially tapered stake 101. By providing movement resistance, the planar members stabilize the support stake so it can withstand environmental effects such as high winds, heavy rainfall, or flood water as well as any tension between the support stake and the object that is being supported.

Figure 4:
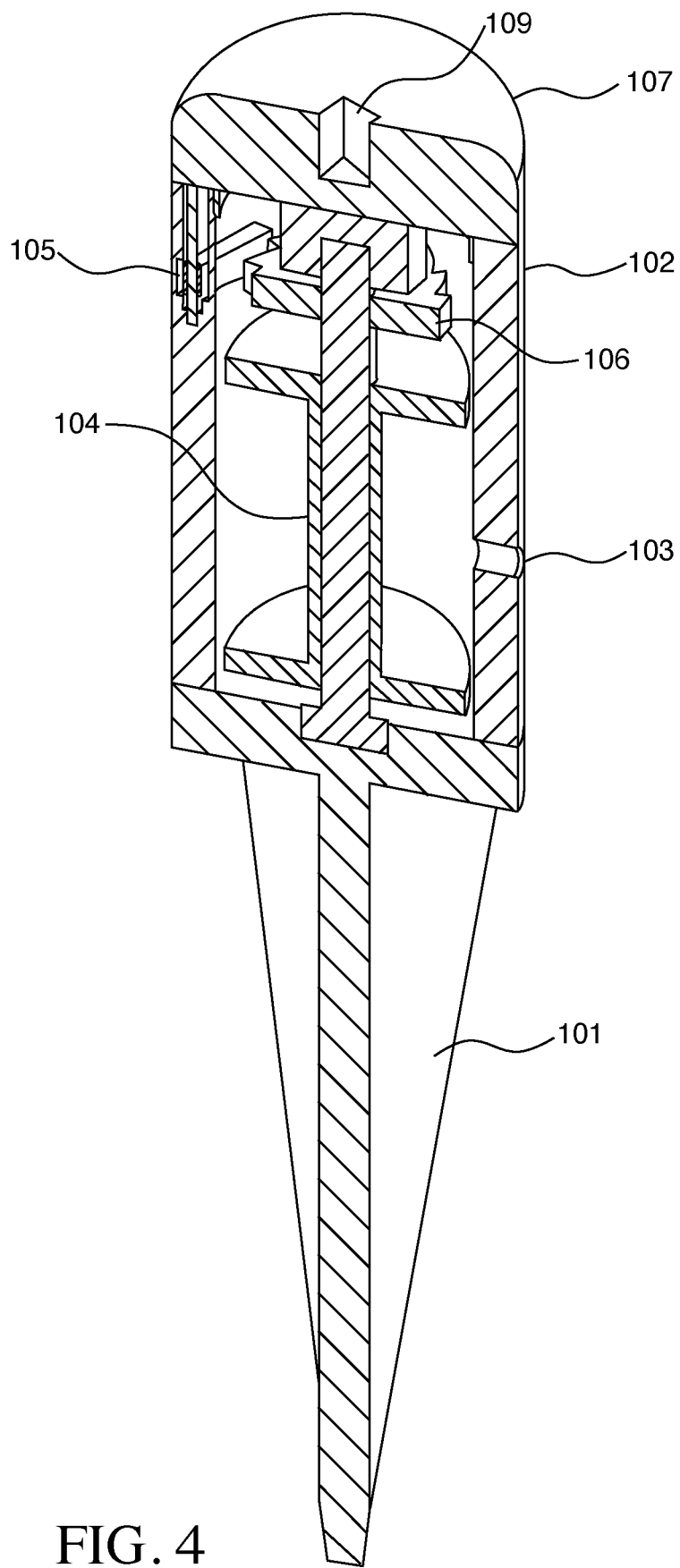
FIG. 4 depicts a cross sectional view of an embodiment of an adjustable support stake system from a side perspective.

In one application, the rotatable member 104 may be configured to attach to a cable 110 and adjust the tension in the cable 110 when the rotational member is rotated. The cable 110 used with the rotatable member may be any string, rope or other suitable cable material 110 that can withstand tension. In another application, as depicted in FIG. 1 and FIG. 4, the aperture 103 is located on a side of the housing 102 and allows access to the rotatable member 104. This location permits a user to thread a cable 110 through the aperture 103 so that it may be attached to the rotatable member 104. This configuration allows for a cable to be used with the adjustable support stake while minimizing any environmental debris that could get caught within the rotatable member 104 while the cable 110 coils around it and impact its function.

In another application, a second aperture may be positioned opposite the first aperture 103 on the housing 102. In this configuration a cable 110 may be threaded through both apertures so that upon rotation of the rotatable member 104 the cable 110 may become bound upon itself. This configuration is advantageous as it eliminates any need to attach the cable 110 to the rotatable member, relying instead on friction between the cable 110 and itself.

In one application, the rotatable member 104 may comprise a gear 106 that is positioned substantially perpendicular to the longitudinal axis 303. The gear 106 may be positioned within the housing 102 so that the gear may be toothedly coupled to the tension release member 105. The alignment and coupling of the tension release member 105 and the rotatable member 104 is depicted in FIG. 2. This configuration allows a user to further adjust the tension in the rotatable member by maintaining tension when engaged and releasing tension when disengaged.

In one application, the tension release member 105 may comprise an outer protrusion 302 and an inner protrusion 301. The tension release member 105 may be positioned on the housing 102 so that the inner protrusion 301 is located on the interior of the housing and the outer protrusion 302 is located on the exterior of the housing. In some applications, the tension release member 105 may be configured to allow a user to couple and decouple the inner protrusion 301 from the rotatable member 104.

By toothedly coupling the inner protrusion 301 to the gear 106 of the rotatable member 104, the tension release member 105 may prevent rotation of the gear 106 in a first direction while allowing rotation in a second direction. This configuration permits the rotatable member 104 to rotate in the second direction and increase tension in an attached cable 110.

By decoupling the inner protrusion 301 from the gear 106 of the rotatable member 104, the tension release member 105 permits the gear to turn in the first direction. This releases any existing tension in the rotatable member 104 and any cable 110 attached thereto.

Figure 3:
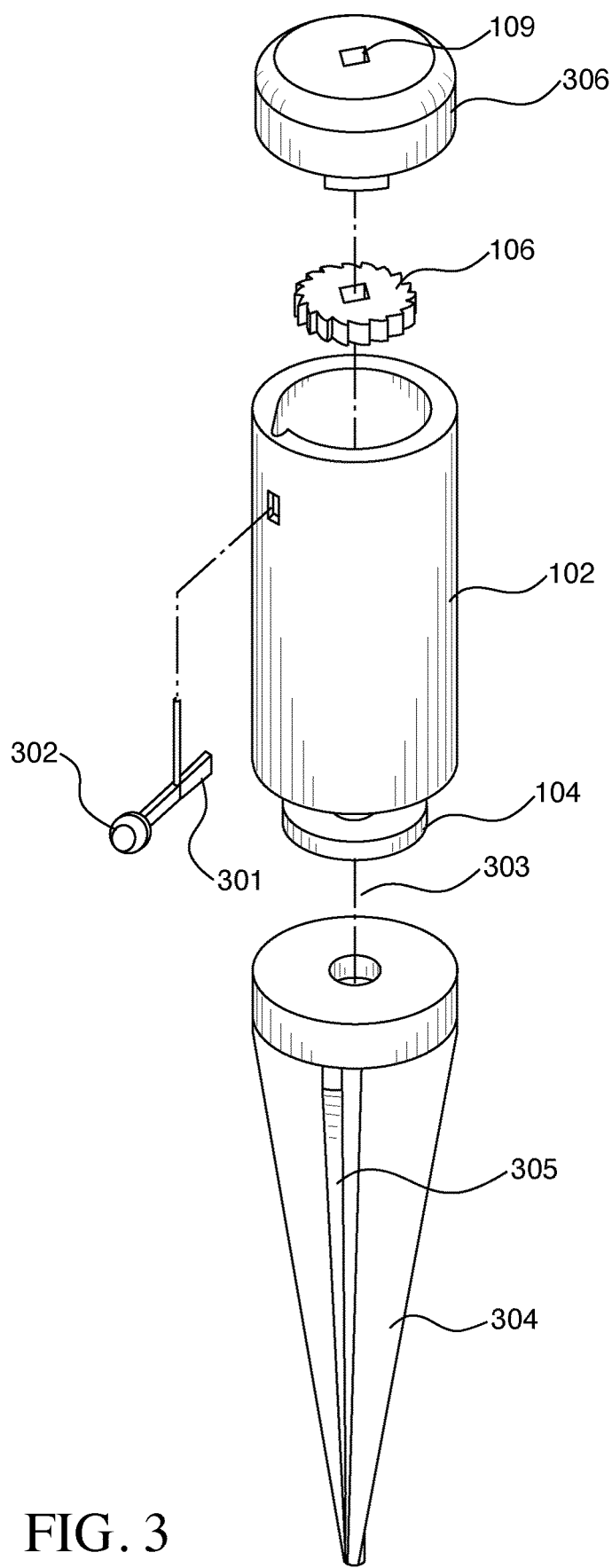
FIG. 3 depicts an exploded view of an embodiment of an adjustable support stake system from a side perspective.

In one application, the access point 107 for the rotatable member 104 may comprise a receiving end 109 configured to interface with a tool. Though, FIGS. 1 and 3-4 depict this receiving end 109 as a square shape, the receiving end may be configured to interface any standard or proprietary tool size and shape such as by nonlimiting example, Phillips screwdriver, flat head screwdriver, wrench, socket wrench, or Allen wrench. This receiving end 109 would allow for a user to rotate the rotatable member 104 in the second direction by inserting a tool into the receiving end 109 and applying rotational force to increase tension.

In another application, the access point 107 for the rotatable member may comprise a rotatable cap 306 with a texturized outer surface 108. FIG. 1 depicts a texturized outer surface 108 in the form of notches on the surface of the rotatable cap 306. However, the texturized outer surface 108 may be comprised of any form of texturization that would allow a user to obtain sufficient grip to rotate the rotatable member 104. The convenience of the adjustable support stake is increased by texturizing the access point 107 for the rotatable member as a user will not need any tools to utilize the inventions.

In one application, the adjustable support stake may be used to support an item above the ground by inserting the first end comprising a substantially tapered stake 101 into the ground. A cable 110 may be attached to both the rotatable member 104 within the housing 102 of the second end and to the item that the user desires to provide support to. Tension may then be created in the cable 110 by rotating the rotatable member 104. If desired, the tension may be released by activating the tension release member 105.

In another application the adjustable support stake may be used by inserting a tool into the receiving end 109 on the rotatable member 104 and rotating the tool around the support stake to create tension in the cable 110. This tool may be a standard wrench, socket wrench, screwdriver, proprietary tool, or any other tool that the receiving end 109 is designed to interface with.

In another application, the adjustable support stake may be used by holding the textured outer surface 108 of the rotatable cap 306 that is attached to the rotatable member 104. The rotatable cap 306 may then be rotated to create tension in the cable 110 attached to the object to be supported. The texturized outer surface 108 may be formed from any texture that would provide sufficient grip to overcome the tension in the cable 110 to the user so that they may rotate the rotatable member. This rotation may be done by hand or any other means by which a user could establish grip with the rotatable cap 306.

In places where the description above refers to particular implementations of systems and methods for an adjustable support stake, it should be readily apparent that a number of modifications may be made without departing from the spirit thereof and that these implementations may be applied to other systems and methods for adjustable support stakes.

I claim:

1. An adjustable support stake system for securing and supporting items above the ground, the support stake system comprising:
a support stake having: a first end further comprising: a substantially tapered stake;
a second end further comprising:
a housing extending along a longitudinal axis and being formed around a rotatable member, wherein the rotatable member is rotatable about the longitudinal axis via an access point on the housing;
wherein the rotatable member is positioned substantially perpendicular and coupled to a tension release member; and wherein the housing contains an aperture that is shaped and positioned to allow access by a cable to the rotatable member; and
a tension release member that is configured to release tension;
the cable having a first end that is attached to the rotatable member within the housing at the second end of the adjustable support stake;
wherein the cable has a second end that attaches to the item to be supported; and
wherein the rotatable member that is rotated to create tension that is maintained via the tension release member.

2. The adjustable support stake system of claim 1, wherein: the rotatable member is configured to adjust the tension in the cable when the rotatable member is rotated.

3. The adjustable support stake system of claim 1, wherein:
the substantially tapered stake comprises two substantially planar members joined substantially perpendicular to each other along the longitudinal axis.

4. The adjustable support stake system of claim 1, wherein: the tension release member comprises an outer protrusion and an inner protrusion and is configured to prevent rotation of rotatable member in a first direction.

5. The adjustable support stake system of claim 1, wherein:
the rotatable member comprises a gear positioned substantially perpendicular to the longitudinal axis, the gear having teeth against which the tension release member engage to maintain the tension.

6. The adjustable support stake system of claim 5, wherein: the tension release member is configured to release the tension in the rotatable member when the tension release member is decoupled from the gear.

7. The adjustable support stake system of claim 1, wherein:
the access point for the rotatable member comprises a receiving end configured to interface with a tool.

8. The adjustable support stake system of claim 1, wherein:
the access point for the rotatable member comprises a rotatable cap further comprising a texturized outer surface.

9. The adjustable support stake system of claim 1, wherein:
the aperture is located on a first side of the housing.

10. A method of using an adjustable support stake for securing and supporting an item above the ground, comprising:
inserting a first tapered end of an adjustable support stake into the ground;
attaching a cable to a rotatable member within a housing of a second end of the adjustable support stake;
attaching the cable to the item to be supported; creating a tension in the cable by rotating the rotatable member about a longitudinal axis via an access point on the housing; and
releasing the tension by activation of a tension release member.

11. The method of using an adjustable support stake of claim 10, wherein rotating the rotatable member via the access point further comprises: inserting a tool into a receiving end on the rotatable member; and rotating the tool around the support stake to create the tension in the cable.

12. The method of using an adjustable support stake of claim 10, wherein rotating the rotatable member via the access point further comprises: holding a textured outer surface of a rotatable cap coupled to the rotatable member; and rotating the rotatable cap to create the tension in the cable.

13. The method of using an adjustable support stake of claim 10, further comprising: adjusting the tension in the cable when the rotatable member is rotated.

14. The method of using an adjustable support stake of claim 10, wherein the first tapered end further comprises a substantially tapered stake; employing the substantially tapered stake which comprises two substantially planar members joined substantially perpendicular to each other along the longitudinal axis.

15. The method of using an adjustable support stake of claim 10, further comprising: preventing rotation of the rotatable member in a first direction via the tension release member which comprises an outer protrusion and an inner protrusion.

16. The method of using an adjustable support stake of claim 10, further comprising: positioning a gear substantially perpendicular to the longitudinal axis; and engaging, by the tension release member, the gear to maintain the tension.

17. The method of using an adjustable support stake of claim 16, further comprising: releasing the tension in the rotatable member via the tension release member when the tension release member is decoupled from the gear.

18. The method of using an adjustable support stake of claim 10, further comprising: interfacing a receiving end of the access point with a tool.

19. The method of using an adjustable support stake of claim 10, wherein the access point comprises a rotatable cap.

20. The method of using an adjustable support stake of claim 19, further comprising: employing a texturized outer surface to the rotatable cap.

* * * * *